Patented Mar. 3, 1936

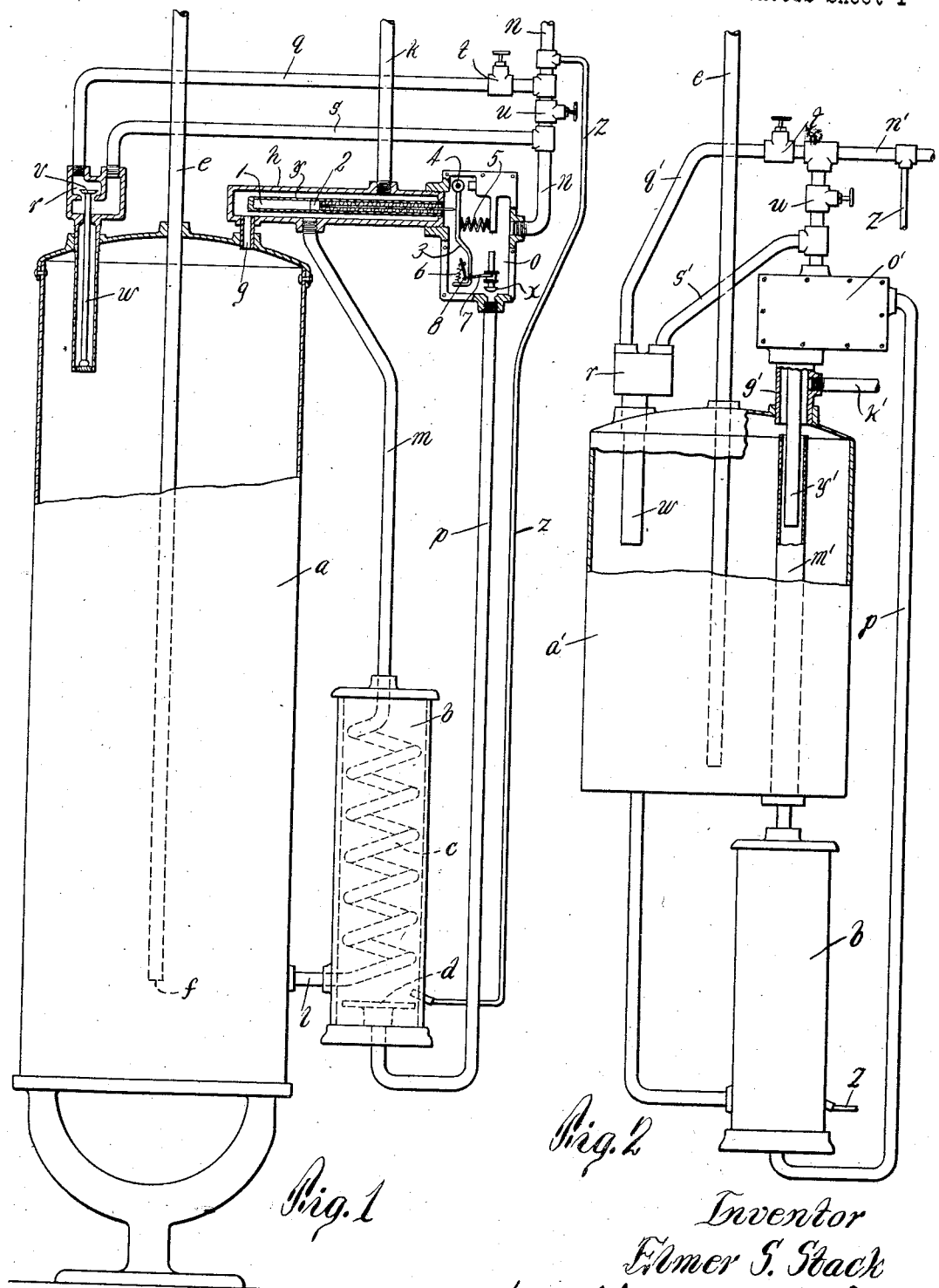

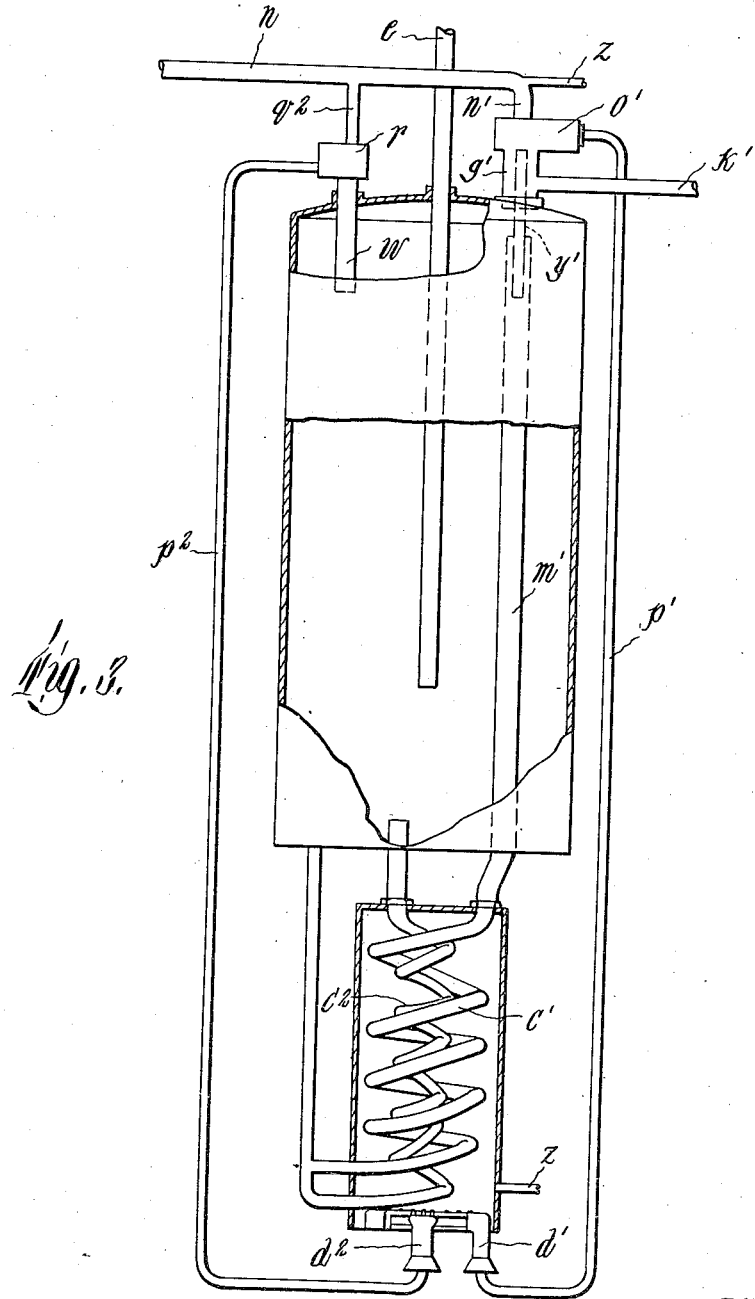

2,032,447

UNITED STATES PATENT OFFICE 2,032,447

WATER HEATING AND STORAGE SYSTEM WITH DUAL THERMOSTATIC CONTROL

Elmer S. Stack, Arlington, Mass.

Application May 12, 1933, Serial No. 670,670

13 Claims. (Cl. 236—20)

The present invention relates to water heating and storage systems for providing a supply of hot water for washing and like purposes in dwellings, etc. It is particularly concerned with those installations in which the heat is provided by an agent capable of being readily turned on and off, such as a gas flame, an electric heating unit, live steam, etc. In the following explanation I will describe the use of the invention in an apparatus having gas as the heating agent, by way of example, and without intent to imply limitation to gas in contradistinction to any other suitable heating medium.

Generation of heat in such systems is commonly controlled by thermostats; and in most of them a single thermostat is used, located near the mid point between top and bottom of the tank. This arrangement is wasteful of the heating agent, for it causes heat generation to continue whether or not any water is being drawn, until the water at the mid level of the tank has been heated to the prescribed temperature of the hot water supply; and by that time the water in the lower half of the tank has been considerably heated and that at the top has been heated to a much higher (and unnecessarily high) temperature. In the absence of personal oversight and regulation, the necessity of which is intended to be avoided by the thermostatic control, a supply of hot water sufficient to meet a peak demand is maintained at all times during the day and night. Much loss of heat occurs by conduction to the surrounding air, in spite of the best available heat insulation, particularly from the overheated top of the tank, so that the heater goes into and out of action many times when no water has been drawn. Thus much heat is expended, inefficiently and wastefully, in proportion to the amount of hot water actually used.

The natural circulation between storage tank and heater is retarded as more and more hot water is stored in the top and adjacent lower levels of the tank, which results in slow passage of water through the heater, with detrimental effect on the heater itself due to overheating of the coils or other conduits which contain the water subject to the heating agent. The serviceable life of the heater is shortened in consequence.

Again, sediment, rust, or other foreign matter gradually collects in the piping and the heater coils, retarding the water circulation. This also causes overheating of water, frequently to the steaming point, with greater and more rapid deterioration of the heating element than results from the accumulation of hot water in the top of the tank.

The object of this invention is to provide a constantly available supply of hot water and any quantity of adequately hot water, (within the delivery capacity of the system), with economical and efficient expenditure of the heating agent; to avoid possibility of overheating the water from any cause at any time; and to regulate the amount of heat applied to the water in the heater according to the temperature of the water passing from the heater. This object is accomplished by new combinations of controlling means for the heating agent with a water heater and a storage container for hot water. The invention consists in the specific combinations of such elements hereinafter described and illustrated in the drawings, and also in equivalent combinations and the generic principles thereof, however embodied in specific apparatus.

The drawings herewith illustrate these principles in three forms of apparatus; Fig. 1 being a diagrammatic elevation partly in section of an arrangement in which the connections between the heater and the storage container are external to the latter; Fig. 2 a similar view of an arrangement in which part of the connections are inside of the storage container; and Fig. 3 being a view similar to Fig. 2 showing a variation in the heat controlling means.

Referring to Fig. 1, which is diagrammatic to the extent that all of the parts are represented in the same plane for convenience and simplicity, and extraneous details not essential to an understanding of the invention have been omitted, $a$ represents a storage tank, and $b$ represents a water heater having an internal heating coil $c$ and gas burner $d$. The tank typifies any container or capacity for holding and storing water; and the heater typifies any water heater, whether specifically like or unlike the present illustration and whether the heating agent be the products of combustion of gas or any other heating means or agent capable of being supplied intermittently under control of the thermostat, and otherwise suitable for the purpose. The inlet pipe $e$ for water to be heated leads, as usual, through the top of the tank to a low point $f$. A fitting $g$ for delivery of hot water is set into the top of the tank and connects with a horizontal conduit $h$ from which the pipe $k$ rises at a point laterally separated from the fitting $g$. The heating coil $c$ is connected to the lower part of the tank by a pipe connection $l$, and its upper end is connected by a pipe $m$ with the conduit $h$ at a point intermediate the fitting g and pipe k. Thus, whenever a hot water faucet is opened, water is drawn from both the heater and the top of the tank, and when all the faucets are closed a circulation of water between the tank and heater takes place.

The heating agent is supplied by a pipe n, here represented as a gas pipe leading to the valve chamber o, from which a pipe p passes to the burner d. A branch pipe q leads from the pipe n to a valve chamber r, from which a pipe s leads back to the supply pipe. A valve t is interposed in the branch q, and a valve u is set in the pipe n between the branches q and s. These valves may be opened, closed and regulated, by hand, to cause flow of gas either through the valve chamber o exclusively, or exclusively in tandem through both chambers, or partly through both channels. For the preferred and most efficient functioning of the apparatus, they are set so that a major proportion of the gas supply passes to the chamber r and is controlled by the valve therein, and a minor proportion flows directly to the chamber o.

A valve v in chamber r opens and closes communication between the pipes q and s and is controlled by a thermostat w set into the upper part of the tank where it is affected by the temperature of water in the upper fraction only of the tank. This may be a relatively small fraction, say a quarter or a sixth, more or less. This valve is preferably of the slow acting throttle type and its controlling thermostat is of a character to cause it to close with high temperature and to open with low temperature of the water.

In the chamber o is a valve x controlled by a thermostat y in the conduit h, such thermostat being preferably of the quick acting type adapted to cause complete opening and complete closing of valve x with a temperature rise or drop, respectively, of only a few degrees, for instance about seven or eight degrees. I have shown here for illustration a commercial type of quick acting thermostat consisting of a tube in which is a body of oil l or other liquid acting on a piston 2, the piston rod of which bears on a lever 3 which is pivoted at 4 in the chamber o and pressed upon in the opposite direction by a spring 5. Lever 3 is connected by a spring 6 with one arm of a bell crank lever 7, pivoted at the point 8, and the other arm of which is coupled with the valve x; these connections being so designed that the thermally controlled movements of lever 3 carry its connecting spring 6 to one side or the other of the pivot 8 so as to cause an instantaneous full opening, or full closing, of the valve in crossing the neutral point. It is to be understood, however, that this description of one suitable form of quick acting thermostatic valve is not a limitation of the invention to the specific valve so described. I may use for either thermostat herein shown any of the thermostatic devices now on the market which are suitable for the purposes in view, or any other which may hereafter become available.

A pilot burner is supplied by a pipe z which leads from the main supply pipe n at a point which is not affected by any of the herein described valves.

In the operation of the apparatus thus described, both thermostatic valves are open when the water is cold. Circulation of water then occurs between the heater and tank, with gradual closing of thermostatic valve v as hot water accumulates in the top of the tank. This valve is fully closed when the water affecting it reaches the prescribed temperature. Valve x being set to close at a slightly higher temperature allows the action to continue with a reduced flame at the burner until all the water in the tank is heated; not necessarily to the same temperature in the lower levels as that in the top of the tank, but to the degree which, with the addition of heat in the heater, causes the water passing from pipe m into conduit h to be hot enough to close valve x. When water is drawn from the tank through pipe k, the sensitive action of thermostat y causes valve x to be opened, but the supply of gas to the burner is then restricted according to the temperature of water surrounding thermostat w. If only a small amount of water is drawn, the heating effect, thus restricted, is enough to heat the water properly. But if a larger quantity is drawn, the temperature of the water affecting thermostat w is reduced by incoming cold water and valve v is opened wider until, when wide open, it admits gas to the full burner capacity (valve x being already widely open) and a rapid generation of heat results. If the burner is made with as great heat generating capacity as those provided with instantaneous water heaters, as it may be, all the heat needed to supply any demand, however great, for hot water may be generated. But only occasionally is any such great demand made on the system. In most instances the demands are met by the stored supply in the tank, or by this supply augmented by a moderate increment of heat from the burner.

It will be noted that the valve x, when closed, prevents any flow of gas to the heater, and that its controlling thermostat is directly in the path of travel of the heated water, whether the water is flowing from the heater to the storage tank, or from both the heater and tank to the point of use. This prevents overheating of the water from any cause. Again, the gas is further controlled by the thermostat w in accordance with the temperature of the water passing into the tank, with valuable effects in economy of gas. As this thermostat diminishes the quantity of gas available to pass the valve x, even when the latter is wide open, it prevents waste of gas and overheating of the water whenever a stored supply of hot water is available, and in proportion to the quantity and temperature of stored hot water.

A further important advantage is that the heater will be turned on only when the water leaving the tank is not at a satisfactory temperature; and that it will be turned on only to the extent necessary to supply the deficiency of heat. However, the control means is so sensitive that the full opening of the gas supply is available whenever large demands are made for hot water in the absence of a previously stored supply.

Thus the system supplies heat to the water where needed, when needed, and in the quantities needed, without waste of heat or overheating of any part of the water, or injury to the heater itself by overheating. The present difficulties of varying hot water temperature due to seasonal changes in the temperature of the water supply, and those due to changes in rapidity of circulation through the heater, are overcome. The heater itself is safeguarded from injury due to overheating, and its life prolonged.

It will be obvious to those skilled in the art that various changes in arrangement of the parts of the apparatus may be made without departing from the principles of the invention. One such is shown in Fig. 2, where the heater is placed below the storage tank and the delivery pipe m' therefrom passes through the bottom of the tank and rises to an outlet point in line with, but below, the hot water discharge fitting $g'$. This arrangement permits water circulation between the heater and tank, and causes hot water drawn from the system to flow partly from the tank and partly from the heater. The valve casing $o'$ and thermostat $y'$ are essentially like the thermostatic valve $o$—$x$—$y$ except that they are differently arranged, and the thermostat $y'$ passes vertically through the fitting $g'$ and into the pipe $m'$. Otherwise the combination is substantially identical with that first described.

It will also be plain that the same principles may equally well be applied to controlling two separate burners, each burner being controlled independently by one of the thermostats. An illustration of such a variation is shown in Fig. 3 where the two burners are $d'$ and $d^2$, the former of which is supplied with gas by pipe $p'$ from valve casing $o'$, and the second by pipe $p^2$ from valve casing $r$. The valve chambers and thermostats shown in this figure are like those shown in Fig. 2 and are similarly arranged, while the valves within them are like those shown in Fig. 1. With this arrangement a small flame is maintained by the burner $d^2$, sufficient to keep the water in the tank hot while no hot water is withdrawn, and the burner $d'$ is turned on when the stored supply of hot water is depleted by withdrawal through the delivery pipe. Gas is delivered to the two valve chambers by branches $n'$ and $q^2$ from the main supply pipe $n$. Obviously a similar division of burners may be provided with tank and heater combinations otherwise similar to that of Fig. 1.

The gas valves and burners herein described are illustrative rather than limiting of the nature of the invention. That is, they typify all equivalent operative means available for heating water, whether the heat is supplied by combustion of fuel, or by a preheated fluid or other heat generating means; and whether the controlling means are valves, electric switches, etc. Fundamentally the invention consists rather in the system of control than in the specific means by which heat is generated and controlled; and within the broad principles of the invention I may use any of a wide variety of heaters, heat generating means, and thermostatic control means. Within the meaning of the term "thermostat" and similar terms, as used herein, I include any devices which are capable of being operated by temperature changes to effect a result in the increase or diminution of heat supply.

What I claim and desire to secure by Letters Patent is:

1. A water heating system comprising a container for storage of hot water, a water heater in circulating connection with said container, a delivery conduit from the container, a heat controlling thermostat located in the container to control a portion of the heat delivered to the water in the heater, and a second heat controlling thermostat located in the path for heated water from the heater to the container and also in the water delivery path from the container.

2. A water heating system comprising a storage container having a water admitting connection, a hot water delivery conduit leading from said container, a water heater in receiving connection with the lower part of the container, a connection between the outlet end of said heater and the upper part of the container, heat supplying means for said heater, and a thermostatic controller for said heat supplying means located both in the outlet from the container and in the connection from the heater to the container.

3. A water heating system comprising a storage container, a water heater, a delivery conduit from the upper part of said container, a connection between the lower parts of the container and heater, means for conveying water from the upper part of the heater to said conduit and to the container, a heat controlling thermostat located in the upper part of the container, a second heat controlling thermostat located in said water conveying means, and means by which said thermostats control the temperature of the water in said heater.

4. A water heating and storage system comprising a tank and a water heater in circulating connection with one another, a cold water inlet pipe entering said tank, a delivery pipe leading from the tank and connected to receive hot water both from said circulating connection and from the tank, and two thermostats for causing more or less heat application to the water in the heater according as one or both of them is affected by low temperature, one of said thermostats being placed clear of the inlet pipe where it is affected only by the temperature of water in the upper part of the tank and the other being placed where it is affected by the temperature of the water in said delivery pipe between the tank and the heater connection.

5. A water heating and storage system comprising a storage tank and a water heater in circulating connection with one another, a hot water delivery pipe leading from the tank and being arranged to receive hot water directly from the heater, valve controlled heat generating means for supplying heat to the water in said heater, a valve controlling a part of the heat supply to said heat generating means, a second valve in series connection with the first named valve for controlling the same, and also an auxiliary supply of heat, a thermostat governing the first named valve located in a position where it is affected by the temperature of water in the tank and a second thermostat controlling the second named valve located where it is affected by the temperature of water as it is delivered from the heater to the tank.

6. A water heating and storage system comprising a tank, an outlet conduit from said tank having a substantially horizontal portion and a rising pipe leading therefrom, a water heater having receiving connection with the lower part of the tank and a delivery connection leading to an intermediate point in said horizontal conduit, a thermostat located in said horizontal conduit to be affected by the temperature of the water passing through the last named connection, a second thermostat located where it is affected by the temperature of water in the tank, and a heat supplying means governed by the respective thermostats.

7. A water heating system as set forth in claim 6 in which the first named thermostat is of the quick acting type adapted to close completely and open with small temperature changes and the second named thermostat is of the gradually acting type adapted to throttle the heat supply more or less according to its temperature-governed condition.

8. In a water heating system of the character described having a storage tank and a water heater, a delivery conduit for hot water leading from the top of the tank, a water heater in receiving connection with the lower part of the tank, a pipe from the heater passing into the tank and terminating therein below and in alinement with the entrance from the tank to said delivery conduit, a thermostat located in said conduit and pipe where it is subjected to the temperature both of the water issuing from the tank and of the water passing from the heater to the tank, and means governed by said thermostat for controlling the amount of heat applied to the water in the heater.

9. A water heating system comprising a container adapted to receive water from an external source and to store hot water, a heating means in circulating connection with said container, a delivery conduit leading from the container, and means for thermostatically controlling the amount of heat applied to the heating means in accordance with the temperature of the water flowing from the container to the heating means and the temperature of the water issuing from the heating means.

10. A water heating system comprising a tank having a cold water inlet and a hot water outlet, a heater having circulating communication with the tank and delivery communication with the outlet from the tank, and thermostatic means for controlling the generation of heat by said heater, including a thermostat affected exclusively by the water in the tank for controlling a part of the heat generation, and a second thermostat affected exclusively by the water in the communication from the heater to the tank and tank outlet for controlling another part of the heat generation.

11. The combination with a water storage tank and a water heating system in circulating connection with the tank, of a hot water delivery pipe connected with the connection through which hot water passes from the heater to the tank, a thermostat located in the last named connection so as to be affected by the temperature both of water flowing from the heater to the tank and of water delivered from the tank and heater through said pipe, a second thermostat located in the tank so as to be affected exclusively by the temperature of the water stored therein, and heat generating means under control of said thermostats; the second thermostat being organized to control a major proportion of the heat generation, the first thermostat being arranged to control a minor proportion of heat generation and to operate at a higher temperature than the second thermostat.

12. The combination with a water storage tank and a water heating system in circulating connection with the tank, of a hot water delivery pipe connected with the connection through which hot water passes from the heater to the tank, a thermostat located in the last named connection so as to be affected by the temperature both of water flowing from the heater to the tank and of water delivered from the tank and heater through said pipe, a second thermostat located in the tank so as to be affected exclusively by the temperature of the water stored therein, a valve chamber and heat controlling valve therein operated by the first thermostat, a second valve chamber and controlling valve therein operated by the second thermostat, and conductors for a heating agent leading respectively from the first named valve chamber to the heater, from a source of supply to both chambers in parallel, and from the second to the first chamber in series.

13. In a water heating and storage system as set forth in claim 12, the combination with shut off means in the parallel conductors leading to the respective chambers operable to regulate the amounts of such heating agent passed to either chamber.

ELMER S. STACK.